(12) United States Patent
Lodge (10) Patent No.: US 8,694,321 B2
(45) Date of Patent: Apr. 8, 2014

(54) IMAGE-TO-SPEECH SYSTEM

(75) Inventor: Stephen Anthony Lodge, Barnsley (GB)

(73) Assignee: Speaks4Me Limited, Hoyland, Barnsley (GB)

( * ) Notice: Subject to any disclaimer, the term of this patent is extended or adjusted under 35 U.S.C. 154(b) by 298 days.

(21) Appl. No.: 12/721,872

(22) Filed: Mar. 11, 2010

(65) Prior Publication Data

US 2010/0231752 A1 Sep. 16, 2010

(30) Foreign Application Priority Data

Mar. 12, 2009 (GB) .................................. 0904282.1

(51) Int. Cl.
*G10L 21/06* (2013.01)

(52) U.S. Cl.
USPC ............ 704/271; 704/235; 704/260; 704/270

(58) Field of Classification Search
None
See application file for complete search history.

(56) References Cited

U.S. PATENT DOCUMENTS

| | | | |
|---|---|---|---|
| 5,113,481 A | 5/1992 | Smallwood et al. | |
| 5,920,303 A | 7/1999 | Baker et al. | |
| 6,903,723 B1 | 6/2005 | Forest | |
| 7,286,649 B1 | 10/2007 | Nelson et al. | |
| 2002/0019892 A1* | 2/2002 | Kondo et al. | 710/62 |
| 2003/0223455 A1 | 12/2003 | Rashdan | |
| 2004/0096808 A1 | 5/2004 | Price et al. | |
| 2007/0064277 A1* | 3/2007 | Shimizu | 358/450 |
| 2007/0162866 A1* | 7/2007 | Matthews et al. | 715/769 |
| 2007/0236489 A1* | 10/2007 | Jung et al. | 345/418 |
| 2007/0236583 A1* | 10/2007 | Vuong et al. | 348/231.99 |
| 2007/0259318 A1 | 11/2007 | Harrison | |
| 2008/0282002 A1* | 11/2008 | Takenaka | 710/72 |
| 2008/0282296 A1* | 11/2008 | Kawai et al. | 725/62 |
| 2009/0185053 A1* | 7/2009 | Ejima et al. | 348/231.99 |
| 2010/0145703 A1* | 6/2010 | Park | 704/260 |
| 2010/0220978 A1* | 9/2010 | Ogikubo | 386/95 |
| 2010/0273458 A1* | 10/2010 | Zueck | 455/413 |

OTHER PUBLICATIONS

Tellus 3+, Techcess Communications Ltd., Sep. 20, 2007, http://www.techcess.co.uk/PDFs/Techcess_Tellus3.pdf.
Mind Express, Techcess Communications Ltd., Sep. 20, 2007, http://www.techcess.co.uk/PDFs/Techcess_Mind_Express.pdf.
The Grid 2 by Sensory Software, Techcess Communications Ltd., Sep. 20, 2007, http://www.techcess.co.uk/PDFs/Techcess_The_Grid.pdf.

* cited by examiner

*Primary Examiner* — Leonard Saint Cyr
(74) *Attorney, Agent, or Firm* — Richard M. Goldberg (57) ABSTRACT

Apparatus for communicating includes a processor, a memory, a storage, a display, a manual input arrangement and audio output. Image data elements are stored in the storage and the processor is configured to output a plurality of the image data elements to the display, receive manual input selecting at least one of the image data elements and receive manual input indicating that selection is completed. For each selected image data element, the processor produces and outputs a further data element.

22 Claims, 8 Drawing Sheets

IMAGE-TO-SPEECH SYSTEM

BACKGROUND OF THE INVENTION

1. Field of the Invention

This invention relates to apparatus for communication.

There are many conditions and illnesses in which a person may be speech impaired, that is unable to talk fluently or at all. If the person is also unable to write or sign, for example because of problems with motor control, then communication can be a problem.

Further, there are times when people are unable to communicate in a foreign country due to a lack of knowledge of the local language.

2. Description of the Related Art

It is known to provide speech-impaired persons with a plurality of images. By either pointing at the images or moving them into place on a provided surface, a person will be able to communicate his or her needs, wants and feelings. However, providing a large number of images soon becomes bulky and unwieldy and the person is restricted to use a really small number of images, not comparable with the large vocabulary available to persons without speech impairment.

Existing equipment for travelers includes automated phrase books, but these often require the user to type in the phrase in their own language before translation. Further, they then require the user to read out the phrase, which can be difficult when the user is unsure of pronunciation.

BRIEF SUMMARY OF THE INVENTION

According to a first aspect of the present invention, there is provided apparatus for communicating, comprising a processor, memory, storage, a display and manual input means, wherein image data elements are stored in the storage and the processor is configured to output a plurality of the image data elements to the display, receive manual input selecting at least one of the image data elements, receive manual input indicating that selection is completed, and for each selected image data element, produce and output a further data element.

DETAILED DESCRIPTION OF THE PREFERRED EMBODIMENT

Figure 1:
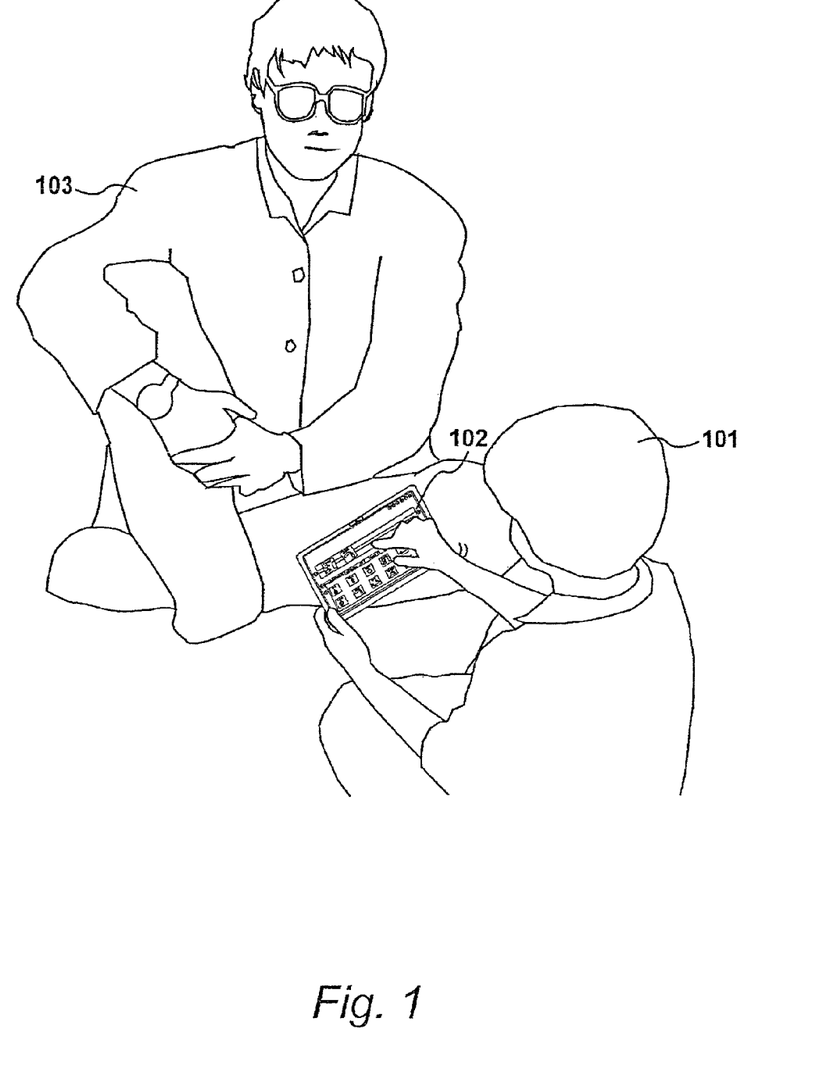
FIG. 1 illustrates a child using a computer running a speech application and a parent receiving communication.

FIG. 1

A child 101 has speech impairment and is using apparatus 102 to communicate with parent 103. Apparatus 102 is in this example a small handheld computer with a touch screen. This computer is large enough to be useful but small enough to be portable by child 101. However, any type of computing apparatus would be suitable for implementing the present invention.

Figure 2:
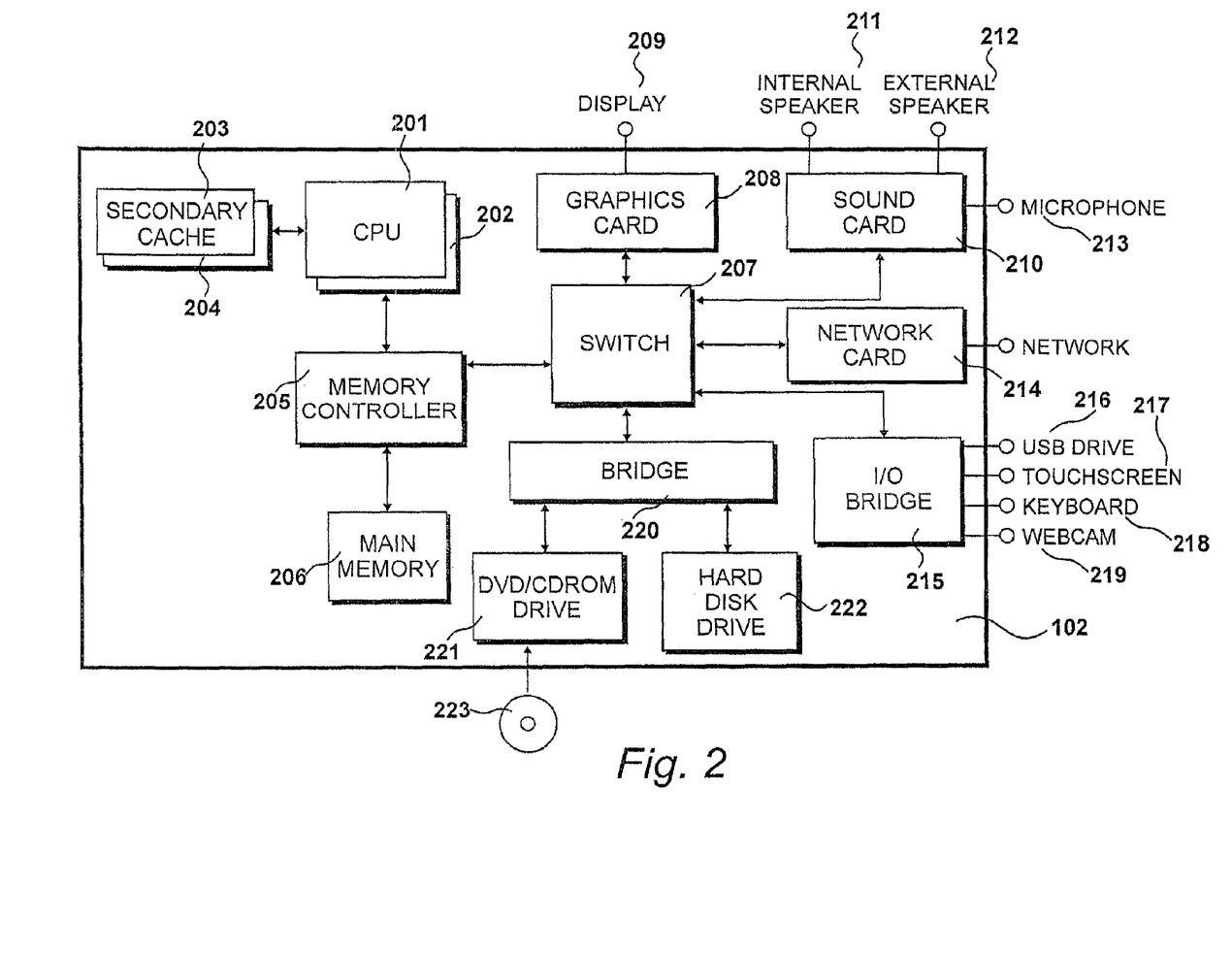
FIG. 2 shows the computer illustrated in FIG. 1.

FIG. 2

The computer 102 shown in FIG. 1 is detailed in FIG. 2. The processing system comprises two central processing units (CPUs) 201 and 202 operating in parallel. Each of these CPUs 201 and 202 has a dedicated secondary cache memory 203 and 204 that facilitates per-CPU storage of frequently used instructions and data. Each CPU 201 and 202 further includes separate primary instruction and data cache memory circuits on the same chip, thereby facilitating a further level of processing improvement. A memory controller 205 provides a common connection between the CPUs 201 and 202 and main memory 206. The main memory 206 comprises two gigabytes of dynamic RAM.

The memory controller 205 further facilitates connectivity between the aforementioned components of the processing system 201 and a high bandwidth non-blocking crossbar switch 207. The switch makes it possible to provide a direct high capacity connection between any of several attached circuits. These include a graphics card 208, which outputs to a display 209, and a sound card 210 which provides output to an internal speaker 211 or an external speaker 212, and receives input from a microphone connection 213. External speaker 212 may be used when the internal speaker 211 is not loud enough. Network card 214 provides connectivity to an external network such as the Internet. A USB input/output bridge 215 provides an interface for a plurality of possible USB devices, such as USB drive 216, touch-screen 217, keyboard 218 and webcam 219. In this example the computer is provided with manual input from a touch-sensitive display, comprising a static-sensing grid placed on top of an LCD display. Alternatively, the keyboard 218 may be used to provide input, or a mouse, graphics tablet, joystick or other manual input device may be plugged in to a USB port. The invention herein described may be used with any type of manual input device that may provide input via any type of connection.

A second bridge 220 facilitates connection between the crossbar switch 207 and a DVD/CD-ROM drive 221. The CD-ROM drive provides a convenient way of receiving large quantities of instructions and data, and is typically used to install instructions for the computer 102 onto a hard disk drive 222, also connected to bridge 220. Instructions also may be installed from another removable computer-readable medium such as USB drive 216, or downloaded from the Internet via network card 214. Once installed, instructions located on the hard disk drive 222 may be loaded into main memory 206 and then executed by the CPUs 201 and 202.

Alternatively, instructions and data for the invention herein described may be loaded into memory 206 directly from a computer-readable medium such as CD-ROM 223 or USB drive 216, and not installed onto hard drive 222 at all.

Other types of processing systems that include some form of processor, memory, storage, manual input means and audio output means could be used. In addition, the device may include various ports for communication, such as an infrared port, a bluetooth transceiver, a wireless network card, and so on.

Figure 3:
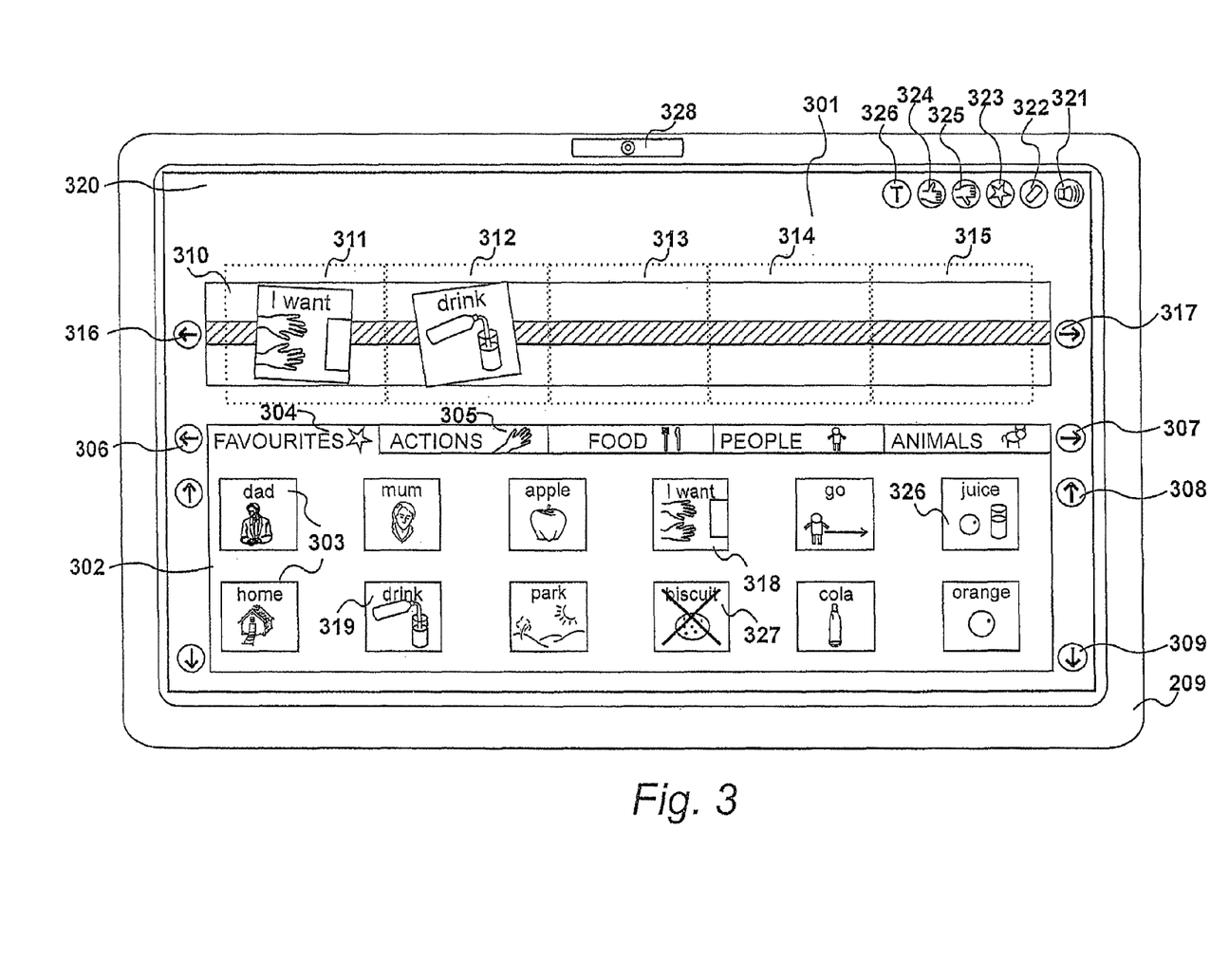
FIG. 3 illustrates an interface displayed on the computer shown in FIG. 1.

FIG. 3

FIG. 3 illustrates the display 209 of a computer 102. The interface 301 of a speech application is shown. The interface comprises three sections. In the image section 302 a plurality of images of 303 are displayed. The images are organised into categories, and each category can be selected by clicking on the appropriate tab, such as tab 304 marked "FAVOURITES", tab 305 marked "ACTIONS", and so on. More tabs can be seen by scrolling sideways using arrow buttons 306 and 307. Within each tab, more images may be seen by operating scroll buttons such as buttons 308 and 309. In other embodiments, gestures can be used to control the touch screen interface instead of buttons.

Interface 301 also comprises a sentence strip 310. Strip 310 includes a plurality of slots that are not visible to the user but are shown in dotted lines on FIG. 3, such as slots 311, 312, 313, 314 and 315. Further slots may be accessed by scrolling sideways using buttons 316 and 317. When child 101 wishes to communicate, he selects one or more of images 303 and drags them to one of the slots. For example, as shown in FIG. 3 he has dragged image 318 labelled "I want" to slot 311, and image 319 labelled "drink" to slot 312. Each image is then displayed within the slot to which it has been dropped. In this example the image is rotated by a random angle between −10° and +10° for display, to mimic the placement of a physical flashcard, but this is a configurable option.

In this embodiment the device has a touchscreen and the method of manual input comprises the user touching the image and dragging it to a slot. Alternatively, the user could touch an image to be moved, and then touch the slot. However, using the touchscreen for input requires a degree of manual dexterity, and thus any other manual input method could be used, such as an eye tracking and monitoring system, a single or dual switch to stop scanning through displayed areas at the required area, and so on. The software is intended for use on many devices and by people with widely differing abilities, and therefore it is designed to be very flexible in its configuration.

Interface 301 also comprises an icon strip 320. In this example the icon strip contains six buttons: button 321 marked with a "speak" icon, button 322 marked with an "erase" icon, button 323 marked with a "favourites" icon, button 324 marked with a "yes" icon, button 325 marked with a "no" icon, and button 326 marked with a "translate" icon. Pressing button 321 causes speech to be produced corresponding to the images in the filled slots. Button 322 functions as a "backspace" button to remove images from slots. A "clear all" button may also be available. Button 323 returns the screen to the "FAVOURITES" tab 304. Buttons 324 and 325 cause the device to emit the words "yes" and "no" respectively.

Other icons may be displayed as required to access other functionality. The software is extremely configurable by an administrator, which may be the user, a parent or carer, and so on.

Thus, for example, if SPEAK button 321 is pressed in the example shown in FIG. 3, the speech "I want drink" will be produced and sent to a speaker by a sound card 210. However, the sentence shown in FIG. 3 may not be finished. The child may also drag image 326, marked "juice", into slot 313. Pressing SPEAK button 321 will then result in the audio "I want drink juice" being sent to the speaker.

Images may also be dragged from one slot to another slot, and an image may be dragged and dropped on top of an already full slot, replacing the image that is there. If an image is dragged from one slot to a slot that already has an image in it, then the two images will swap positions. If the user puts images in an order which does not make sense, or leaves unfilled slots between images, then it is up to the recipient, such as parent 103, to decide whether to accept the communication, or to make the user rearrange the images in the slots before accepting the communication, as would normally be done when teaching a child to read or speak.

Images may be rearranged within tabs according to how often they are used, with the most-used images at the top. For example, the FAVOURITES category may be initially filled by an administrator or may contain the user's most-used images, determined from frequency of use information as will be described further with reference to FIG. 4.

The recipient of the communication, such as parent 103, may wish to indicate that a particular image is not available. Thus, for example, image 327, marked "biscuit", has a cross placed over the top of it. This indicates to child 101 that the word "biscuit" is not available for use. Child 101 is now unable to select image 327 until parent 103 removes the cross. This may be of particular use when a user is unable to understand that a certain item may be temporarily or permanently unavailable even though an image is selectable. Alternatively, the image may be selectable but it is not read out when the "SPEAK" button is pressed, or the image may be usable but the parent chooses to ignore the communication.

When the user selects one of the images 303, the selected image increases in size and the audio corresponding to that image may be heard. This provides a visual and aural confirmation that the user has selected the correct image. A boundary surrounding each slot may be set so that a dropped image "snaps" to a slot. This may be of use for users who do not have sufficiently fine motor control. Further, the size of the images 303 may be configured.

The display shown in this Figure and the described interface is only an example of displays and interfaces that could embody the invention. All of the described features are configurable to allow for a user's individual requirements and preferences. Thus an administrator's control panel (not shown) is provided to allow the administrator to configure the application.

New images may be added. An administrator may use webcam 328 to take a photograph, or add an image from another location. These images must be named so that the speech-to-text module can process them. However, the administrator may also record his or her own voice for use with any or all images. The administrator may also add text data elements.

Figure 4:
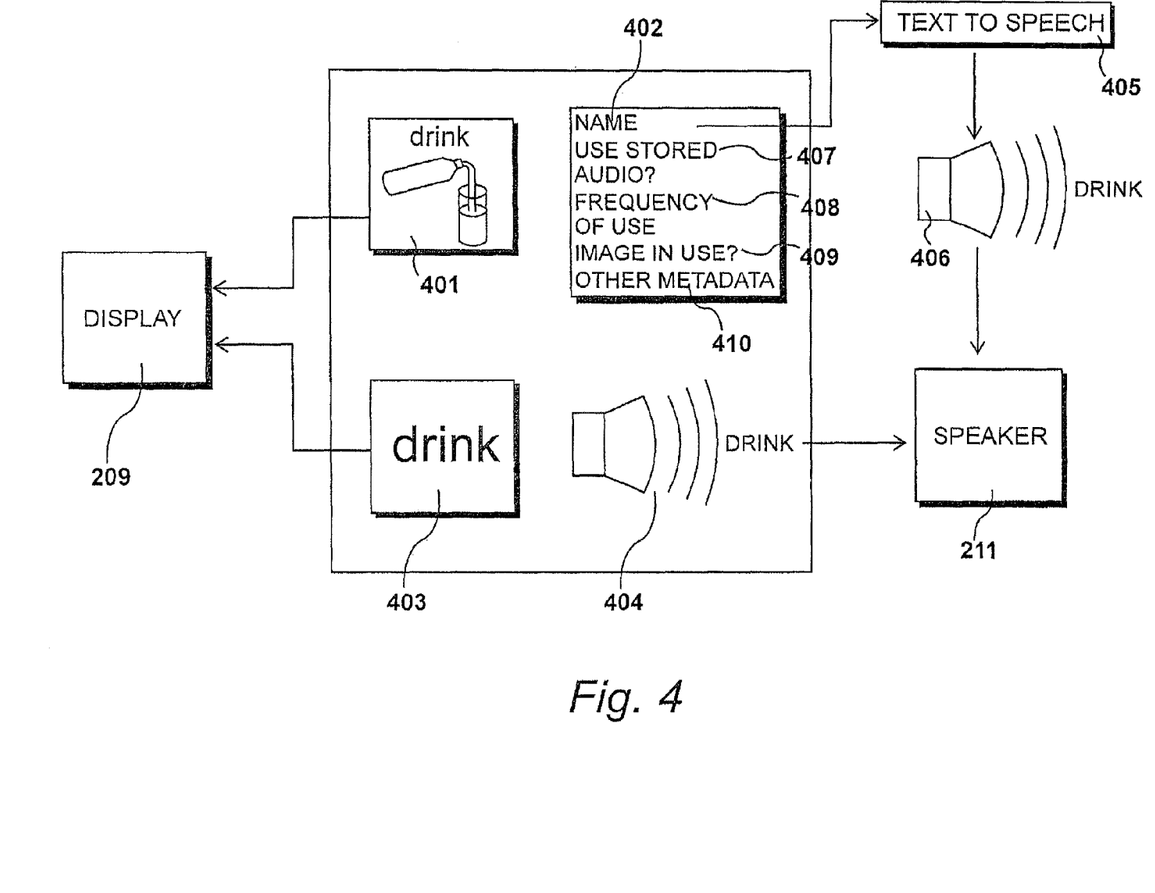
FIG. 4 illustrates the speech application in use.

FIG. 4

Each of images 303 is stored within storage on computer 102. They may be stored on hard drive 222, or on a removable medium such as USB drive 216 or CD-ROM 223. FIG. 4 illustrates the storage of the images.

To implement the invention described herein, a number of data elements may be stored for each word that the user wishes to express. The example shown is the word "drink". An image data element 401 is stored, which is output to display 209 as image 319. Image data element 401 has associated metadata, including name 402, "drink". A text data element 403 may also be stored in the storage. This comprises the word "drink" and may be stored as text or as an image. Text data element 403 may also be output to display 209, as will be further described with reference to FIG. 8. An audio data element 404 representing the spoken word "drink" may also be stored, and output to speaker 211 in response to the user selecting image 319. Preferably, the word "drink", the name 402 of image data element 401, is converted using a text-to-speech module 405, thus generating audio data element 406. Thus an audio data element is produced, but it may be retrieved from storage or generated.

The name and any stored audio or text data elements could be in any language, thus enabling the device to be used in any country around the world with small changes to the display screen, such as the names of the tabs and the language used on the control panel. A home language may be set on the control panel to ensure that the display uses the correct language and accesses the correct data elements.

In addition, the speech may be produced in a language different from that used on the displayed screen. This translation language can be also selected in the control panel, or may be selected from a drop-down box in the icon strip 320. This aspect of the software is considered to be more useful to travelers than to speech-impaired persons, but the functionality is the same. In this case, the device used could be much smaller, such as a mobile telephone, since motor skills would not be an issue. This would allow travelers to use a small portable device to generate speech in a foreign language in an easy manner, simply by dragging images and pressing a button, removing the need to look up a phrase in a phrase book and attempt to pronounce it.

This functionality could also be implemented by storing an audio data element in the foreign language for each data element, rather than using a text-to-speech module.

Further, the device could be configured such that when the "SPEAK" button is pressed, text data elements in the home language or a foreign language are retrieved and sent over a network connection, for example as an email or SMS message. This would allow users to create messages in a foreign language.

Metadata for image data element 401 includes an indication 407 of stored audio to use. More than one audio data element may be stored for each image data element, and indication 407 either refers to one of these or is blank. Frequency of use information 408 is a tally of how often the image has been used. Preferably, it is only counted when the word is actually spoken, rather than when it is moved to a slot, as this is a more accurate indication of frequency of use. Frequency of use information can be used when displaying interface 301, to populate the "FAVOURITES" tab and to alter the position of images within all the tabs. Image available information 409 is an indication of whether the image should be displayed with a cross over it. Other metadata 410 includes other data used to display the image.

In the preferred embodiment, all of the data elements, including the metadata, are stored in a database. Relationships between tables and the database ensure that image data elements, text data elements and audio data elements are associated with each other. However, other methods of storage are possible; for example, the data elements could be simple files. Whatever way they are stored, it is preferable that the data elements be encrypted in order to avoid unauthorised replication and security of the data elements.

Other data stored in the device includes history of use of the device. For example, it may record how often the "speak" button has been pressed. In addition, the device may require feedback from a recipient every time speech is generated, for example by displaying "YES" and "NO" buttons on display 209 for the recipient to indicate whether or not the communication has been accepted. Over time, this will indicate how successful the user has been at communicating. This data can be used, for example, to provide information to the administrator about how the user is communicating with other people. The data can also be used to provide behavioural reinforcement to the user. For example, when the user has communicated, either successfully or at all, a number of times, a stimulus may be displayed on display 209. This could be a short audio-visual data clip, a game to play, a gold star, praise, or any other reinforcement that the administrator considers suitable. Over time, the user would need to communicate more in order to receive the same reinforcement.

Periodically the device may be connected, for example over the Internet, with a remote server. This will provide updates to the software, additional data elements, data synchronising, and so on. An administrator may purchase additional image sets or languages, and data relating to use of the software may be uploaded to the server.

Figure 5:
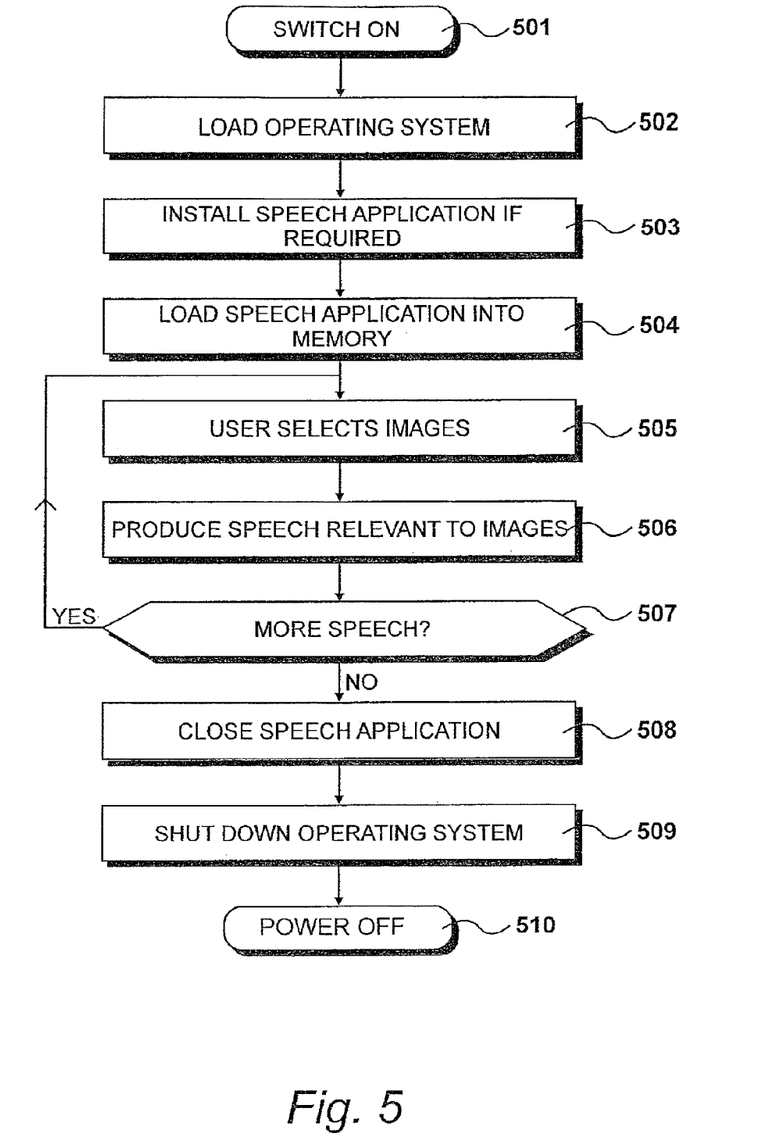
FIG. 5 details steps carried out by the computer shown in FIG. 1 to run the speech application.

FIG. 5

FIG. 5 details steps carried out by computer 102 to facilitate communication between a user and a recipient. At step 501 the computer is switched on and at step 502 the operating system is loaded. At step 503 the speech application is installed if required. It may be installed from a removable medium or from the Internet. At step 504 the speech application is loaded into memory, either from hard drive 222 or from the removable medium on which it resides. On installation or first use the software is registered and activated, and a check is made whenever it is loaded that activation has taken place.

At step 505 the user selects images, and at step 506 the application produces speech relevant to the images. At step 507 a question is asked as to whether the user wishes to produce further speech and if this question is answered in the affirmative control is returned to step 505 and the user selects more images. Alternatively, the question is answered in the negative and at step 508 the speech application is closed down.

Subsequent to this, the operating system is closed down at step 509 and the computer is powered off at step 510.

Figure 6:
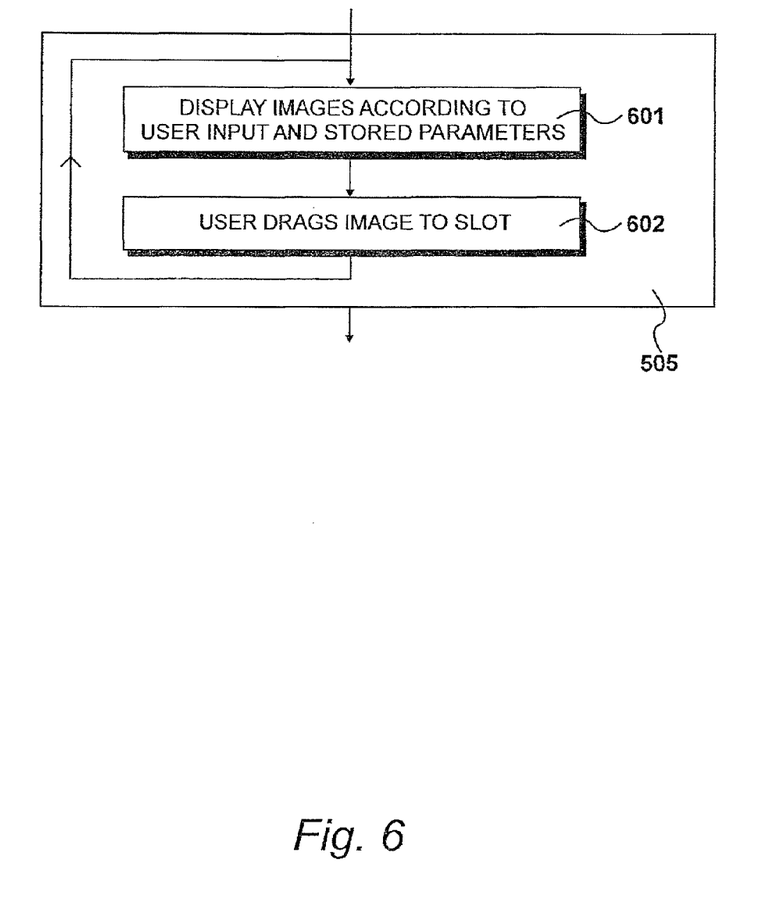
FIG. 6 details steps carried out in FIG. 5 to select images.

FIG. 6

FIG. 6 details step 505 at which the user selects images. At step 601 images are displayed on interface 301 according to user input and stored parameters. The parameters may be, for example, the size of the images, the number of category tabs visible, whether an image comprises more text than picture (see FIG. 8), the ordering of the images within category tabs, the ordering of the tabs themselves, the placing of images within the tabs, the placing of red crosses on certain images, and so on. The user input may be the selection of tabs and scrolling up and down to view different images.

At step 602 the user drags an image to one of the slots. Control is then returned to step 601 and images are redisplayed as necessary according to user input. Eventually the user will complete their selection of images, at which point step 505 is completed.

Figure 7:
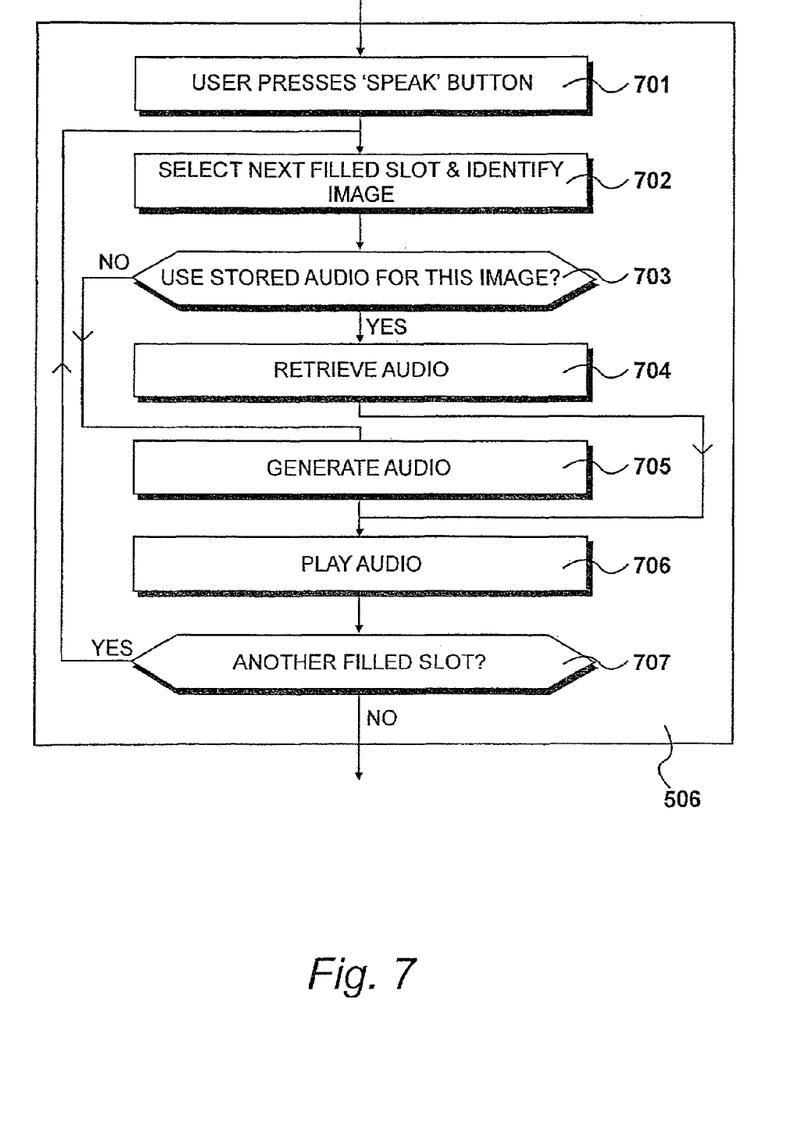
FIG. 7 details steps carried out in FIG. 5 to produce audio data elements.

FIG. 7

FIG. 7 details step 506, at which speech is produced relevant to the images selected at step 505. At step 701 the user presses SPEAK button 321. At step 702 the first filled slot is selected and the image in it is identified. At step 703 a question is asked as to whether a stored audio data element is to be used for this image, and if this question is answered in the affirmative the audio data element is retrieved at step 704. Alternatively, the question is answered in the negative and an audio data element is generated using text-to-speech module 405 at step 705. In either case, the audio data element is played at step 706 and at step 707 a question is asked as to whether there is another filled slot. If this question is answered in the affirmative control is returned to step 702 and the next filled slot is selected. Alternatively, all the speech has been generated and step 506 is completed.

Alternatives to the above method could be used. For example, all of the audio elements could be accumulated before being output, which could avoid pauses between words. As a refinement, the sentence could be passed through a grammatical module that inserts words like "a" and "of", thus changing "I want drink juice" to "I want a drink of juice".

Figure 8:
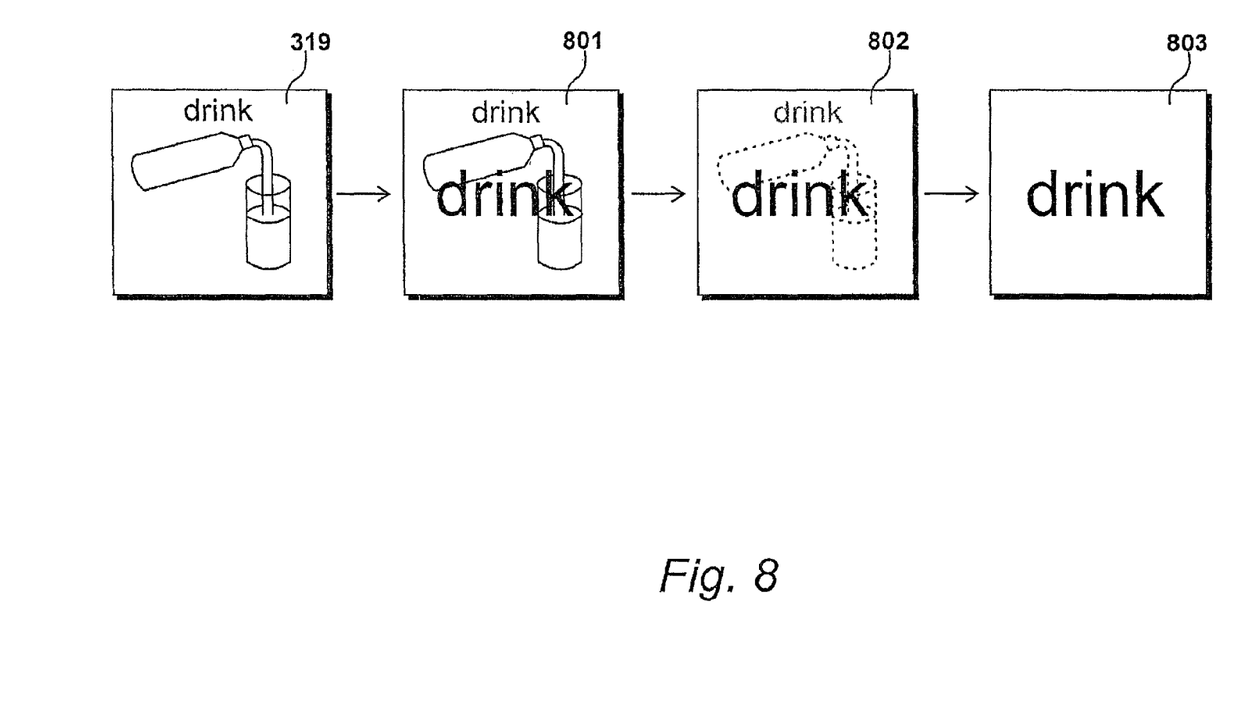
FIG. 8 illustrates how a displayed image may change according to its frequency of use.

FIG. 8

FIG. 8 illustrates the way in which the user of the speech application running on computer 102 may be encouraged to learn to read while communicating with other people. Image data element 401 is displayed within interface 301 as image 319. In this example, it includes a picture of a drink with the word "drink" written above, but the word may not be included with the image. The inclusion of the word helps the user to associate the word with the image and support a consistent reference of the object image. Optionally, the word may also be overlaid on the image, as described below, if configured to do so in the administrator control panel.

When frequency of use parameter 408 reaches a certain threshold, image data element 401 is output to display 209 with an overlay of text data element 403 as image 801. In this example, the overlay is in the middle of the image, but it could be anywhere in the visible area. The overlay has a high transparency value and therefore the word "drink" is only just visible on top of image data element 401 in image 801. The transparency value of the overlaid text data element is inversely relative to the frequency of use parameter, while the transparency of the image data element is directly relative to the frequency of use parameter. Thus, as the user uses the word "drink" more and more, the background image fades away and the word becomes more prominent, for example as shown in image 802. Eventually, the transparency of the image data element is 1 and the transparency of the overlay is 0, resulting in image 803 which consists only of the word "drink".

The relationship between the frequency of use and the transparency can be altered by an administrator, according to the user's abilities. The relationships can be different for different words, different categories of word, and so on.

What is claimed is:

1. Apparatus for communicating, comprising a processor, a memory, a storage, a display and a manual input arrangement, wherein image data elements are stored in said storage and said processor is configured to:
    output a plurality of said image data elements to said display;
    output a plurality of empty slots to said display;
    process at least two manual inputs, wherein for each said manual input said processing comprises:
        receiving said manual input, wherein said manual input selects at least one of said image data elements and drags said selected image data element to one of said empty slots, and
        displaying said selected image data element in said slot, and
    arranging said image data elements in a desired sequential order in a group in at least two said empty slots;
    receive a further manual input indicating that a selection is completed; and
    for each group of said selected image data elements, produce and output a further data element as an originally generated formed sentence structure in real time, formed by said sequential ones of said image data elements in said desired sequential order, wherein said sentence structure is output in the order in which said selected image data elements are displayed in said slots.

2. Apparatus according to claim 1, wherein said apparatus further comprises an audio output, each said further data element is an audio data element that represents a spoken word relevant to said image data element, and each said audio data element is output to said audio output.

3. Apparatus according to claim 2, wherein for each of said image data elements a name is stored, and for each said selected image data element, said processor is configured to produce an audio data element by converting the name of said image data element to speech.

4. Apparatus according to claim 2, wherein audio data elements are stored in said storage and each of said image data elements is associated with an audio data element, and for each said selected image data element, said processor is configured to produce an audio data element by retrieving an associated audio data element from storage.

5. Apparatus according to claim 1, wherein for each of said image data elements a name is stored, and said apparatus further comprises a network connection, each said further data element is a name of each said image data element, and said names are combined to produce a message that is output via said network communication.

6. Apparatus according to claim 1, wherein said processor is further configured to receive a manual input indicating a language, and wherein each said further data element is in said language.

7. Apparatus according to claim 1, further comprising a camera and an audio input, wherein said processor is further configured to:
    receive an image data element via said camera;
    receive an audio data element via said audio input;
    store said data elements in said storage; and
    store, in said storage, an indication that said data elements are associated with each other.

8. Apparatus according to claim 1, wherein each of said image data elements belongs to a category, and said processor is configured to display image data elements of the same category together.

9. Apparatus according to claim 1, wherein said processor is configured to store information regarding frequency of use of said image data elements.

10. Apparatus according to claim 9, wherein said processor is further configured to alter the prominence of displayed image data elements relative to their frequency of use.

11. Apparatus according to claim 10, wherein text data elements are stored in said storage, each said text data element being associated with an image data element, and said processor is further configured to, when outputting an image data element to said display:
    retrieve the text data element associated with said image data element;
    retrieve a frequency of use parameter for said image data element; and
    output said text data element to said display as an overlay on said image data element, wherein the amount of transparency of said overlay is inversely relative to said frequency of use parameter.

12. Apparatus according to claim 11, wherein said processor is further configured to alter the transparency of said image data element relative to said frequency of use parameter.

13. A method of communication, comprising:
    storing image data elements;
    displaying a plurality of said image data elements;

displaying a plurality of empty slots;

processing at least two manual inputs, wherein for each said manual input said processing step comprises:

receiving said manual input, wherein said manual input selects at least one of said image data elements and drags said selected image data element to one of said empty slots, and displaying said selected image data element in said slot;

arranging said image data elements in a desired sequential order in a group in at least two said empty slots;

receiving a further manual input indicating that selection is completed; and for each group of said selected image data elements, producing and outputting a further data element as an originally generated formed sentence structure in real time, formed by said sequential ones of said image data elements in said desired sequential order, wherein said sentence structure is output in the order in which said selected image data elements are displayed in said slots.

14. A method according to claim 13, wherein each said further data element is an audio data element that represents a spoken word relevant to said image data element, further comprising the step of outputting each said audio data element to an audio output.

15. A method according to claim 14, further comprising the step of storing a name for each of said image data elements, and for each said selected image data element, said step of producing an audio data element is performed by converting the name of said image data element to speech.

16. A method according to claim 13, further comprising the step of storing a name for each of said image data elements, wherein for each image data element, said step of producing said further data element comprises retrieving the name of said image data element, further comprising the step of combining said names to produce a message that is output via a network communication.

17. A method according to claim 13, further comprising the step of receiving an indication of a language, and wherein each said further data element is in said language.

18. A method according to claim 13, further comprising the step of storing information regarding frequency of use of said image data elements.

19. A method according to claim 18, further comprising the step of altering the prominence of displayed image data elements relative to their frequency of use.

20. A method according to claim 19, further comprising the step of storing text data elements, each said text data element being associated with an image data element, and said step of displaying an image data element comprises:

retrieving the text data element associated with said image data element;

retrieving a frequency of use parameter for said image data element; and displaying said text data element as an overlay on said image data element, wherein the amount of transparency of said overlay is inversely relative to said frequency of use parameter.

21. A method according to claim 20, further comprising the step of altering the transparency of said image data element relative to said frequency of use parameter.

22. A non-transitory computer-readable medium having computer-readable instructions executable by a computer, such that when executing said instructions a computer will:

store image data elements;

display a plurality of said image data elements;

display a plurality of empty slots;

process at least two manual inputs, wherein for each said manual input said processing step comprises:

receiving said manual input, wherein said manual input selects at least one of said image data elements and drags said selected image data element to one of said empty slots, and displaying said selected image data element in said slot;

arranging said image data elements in a desired sequential order in a group in at least two said empty slots;

receive a further manual input indicating that selection is completed; and for each group of said selected image data elements, produce and play an audio data element that represents spoken words relevant to said image data elements as an originally generated formed sentence structure in real time, formed by said sequential ones of said image data elements in said desired sequential order, wherein said sentence structure is output in the order in which said selected image data elements are displayed in said slots.

\* \* \* \* \*